(12) United States Patent
Guo et al.

(10) Patent No.: US 7,536,467 B2
(45) Date of Patent: May 19, 2009

(54) PEER-TO-PEER (P2P) MOBILITY SYSTEM, AND METHOD

(75) Inventors: Chuanxiong Guo, Nanjing (CN); Haitao Wu, Beijing (CN); Kun Tan, Beijing (CN); Qian Zhang, Beijing (CN); Wenwu Zhu, Basking Ridge, NJ (US)

(73) Assignee: Microsoft Corporation, Redmond, WA (US)

( * ) Notice: Subject to any disclaimer, the term of this patent is extended or adjusted under 35 U.S.C. 154(b) by 856 days.

(21) Appl. No.: 10/828,400

(22) Filed: Apr. 20, 2004

(65) Prior Publication Data

US 2005/0251577 A1 Nov. 10, 2005

(51) Int. Cl.
*G06F 15/16* (2006.01)
*G06F 15/173* (2006.01)

(52) U.S. Cl. .............. 709/230; 709/238; 709/239; 709/240; 709/241; 709/242; 709/243; 709/244; 370/392; 370/395

(58) Field of Classification Search .............. 709/230, 709/238–244
See application file for complete search history.

(56) References Cited

U.S. PATENT DOCUMENTS

| | | | |
|---|---|---|---|
| 6,047,283 A * | 4/2000 | Braun | 707/3 |
| 6,181,698 B1 * | 1/2001 | Hariguchi | 370/392 |
| 6,510,435 B2 * | 1/2003 | Bayer | 707/100 |
| 6,526,055 B1 * | 2/2003 | Perlman et al. | 370/392 |
| 6,546,425 B1 * | 4/2003 | Hanson et al. | 709/227 |
| 6,581,106 B1 * | 6/2003 | Crescenzi et al. | 709/242 |
| 6,768,739 B1 * | 7/2004 | Kobayashi et al. | 370/392 |
| 6,879,574 B2 * | 4/2005 | Naghian et al. | 370/338 |
| 6,947,415 B1 * | 9/2005 | Nagaraj | 370/389 |
| 6,956,858 B2 * | 10/2005 | Hariguchi et al. | 370/395.31 |
| 6,981,047 B2 * | 12/2005 | Hanson et al. | 709/227 |
| 7,136,645 B2 * | 11/2006 | Hanson et al. | 455/435.1 |
| 7,191,168 B1 * | 3/2007 | Buchsbaum et al. | 707/2 |
| 2003/0235175 A1 * | 12/2003 | Naghian et al. | 370/338 |
| 2004/0054807 A1 * | 3/2004 | Harvey et al. | 709/243 |
| 2004/0107295 A1 * | 6/2004 | Herkersdorf et al. | 709/242 |
| 2005/0169219 A1 * | 8/2005 | Serpa et al. | 370/338 |

* cited by examiner

*Primary Examiner*—John Follansbee
*Assistant Examiner*—Saket K Daftuar
(74) *Attorney, Agent, or Firm*—Lee & Hayes, PLLC

(57) ABSTRACT

An end host in a peer-to-peer system stores identifiers for both its peers and the neighbors of its peers. When the IP address of the end host and one of the peers changes, the end host's new IP address can be sent to each neighbor of the peer so that communication between the end host and the peer will not be lost. The order in which the neighbors of the peer are stored can be prioritized for faster delivery of the end host's changed IP address to the peer. The prioritizing can be by available bandwidth of the neighbors, proximity of the neighbors, trust between the peer and its neighbors, the probability that the IP address of the neighbors will change, etc. Proximity of the peers from each other and the end host can be a function of the identifier, which can be generated from a public key.

23 Claims, 9 Drawing Sheets

Prioritized Neighbor Hint Table (NHT)

Prioritized Neighbor Hint Table (NHT)

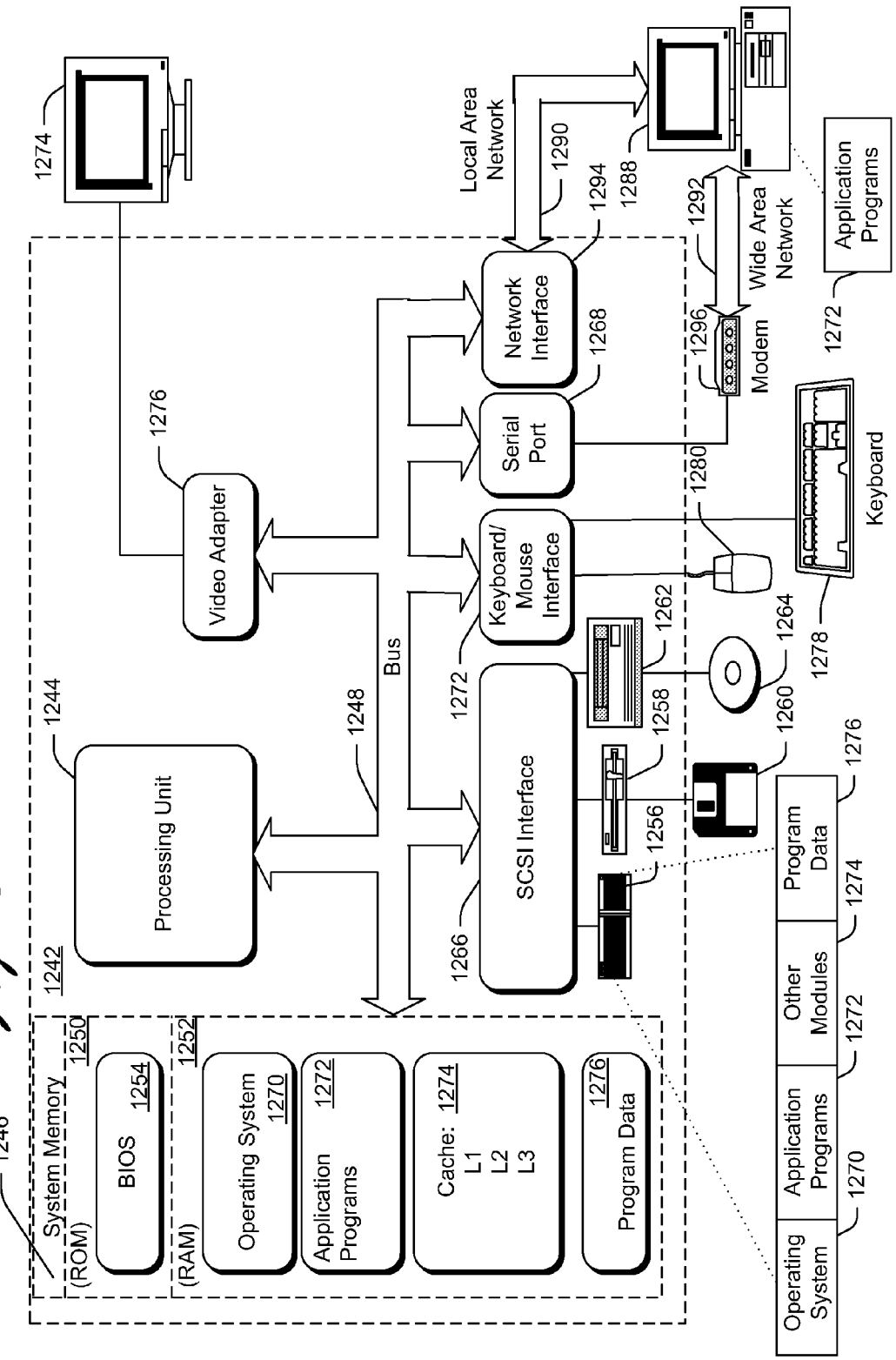

PEER-TO-PEER (P2P) MOBILITY SYSTEM, AND METHOD

TECHNICAL FIELD

This invention relates to peer-to-peer communications and to communications during the mobility of a host and/or its peers in a peer-to-peer system.

BACKGROUND

Peer-to-peer (P2P) systems employ a network which connects participating machines having equal or similar capabilities and responsibilities. These systems perform tasks without the coordination of a conventional server (or with minimal set-up coordination by a server).

A P2P network is a distributed system, without any centralized control or hierarchical organization, in which each node runs software with equivalent functionality. The current Internet is composed of two components: end hosts and routers. The end hosts use the routers to deliver data packets to each other. The role of the routers is to store and forward the data packets for the end hosts. The end hosts in general do not forward packets for other end hosts in this model. As seen in FIG. 1a, a P2P network is an overlay network constructed with a variety of wired and wireless end hosts, where each end host will forward packets for other end hosts. The overlay is a data structure comprised of objects each representing a peer in the P2P network.

By way of another example, FIG. 1b shows a high-level depiction of a P2P system 100b. The system 100a includes a collection of peer entities (102-112) having equal or similar capabilities and responsibilities. In one example, the peer entities (102-112) may correspond to independent personal computer devices coupled together via an Internet or intranet. The peer entities (102-112) can directly transfer files or other information between themselves (as indicated by exemplary communication path 114) without the aid of a server. A general introduction to P2P systems can be found in D. S. Milojicic, V. Kalogeraki, R. Lukose, K. Nagaraja, J. Pruyne, B. Richard, S. Rollins, and Z. Xu., "Peer-To-Peer Computing," Technical Report HPL-2002-57, HP Lab, 2002.

P2P systems offer many benefits over conventional client-server strategies. For instance, P2P systems have the ability to automatically and freely expand and contract without central coordination. But this lack of supervisory coordination also poses various challenges. For instance, it may be desirable to have the P2P system act in concert to perform some global function. In various instances, it may be desirable to collect data from the participants of the P2P system. Or it may be desirable to disseminate information to the participants in the P2P system. With a client-server approach, a server can simply poll its clients to collect information from its clients, or broadcast information to its clients to disseminate information to its clients. But data gathering and dissemination becomes more problematic in a P2P system because it is formed by a loose alliance of interconnected peers that can freely come and go. Adding centralized conventional reporting functionality may have the effect of complicating the P2P system, and thus reducing its flexibility and utility.

In a P2P network, an end host is assigned unique identifier (e.g., a 'hostID'). This hostID is generally generated using some hash methods from the IP address of the host and/or a public key of the end host. Each end host maintains a "routing table". By using this routing table, the end host can decide the next peer to route a message to (e.g., the "next hop" to the peer). The basic service provided by a P2P network is a "lookup" service. By this lookup service, the P2P network can map a "key" to an active end host in the P2P network which owns the key.

Since the P2P network is an overlay built based on end hosts, it does not need to change or extend the underlying Internet routing infrastructure. New services based on P2P technology can be rapidly deployed and tested without the Internet service providers' involvement.

When a peer in a P2P network moves, such as when the peer is a mobile computing device (i.e., a cellular telephone, a wireless computer, etc.), the peer's Internet Protocol (IP) address can change. In various circumstances, a change in the IP address can prevent a peer from communicating with its peers. For such circumstances, there is a an exemplary need in the art for an end-to-end mobility management technique to solve the problem of using a peer's name to resolve its changed IP address, and to solve the problem of notifying the peer's peers of a change in the peer's IP address.

SUMMARY

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

According to one exemplary implementation, an end host has a memory that includes executable instructions and storage for respective identifiers for respective peers of the end host in a peer-to-peer system. The memory also has an array for each peer of the end host. Each array includes one of more entries. Each entry corresponds to one neighbor peer of one peer of the end host (NPOP). Each entry also includes an identifier for the NPOP. A processor of the end host executes the executable instructions.

When the executable instructions are executed, the end host interacts as a peer in a peer-to-peer fashion in the peer-to-peer system. The storage in the memory includes a multi-level routing table cache (MRTC). Each level in the MRTC has a maximum number of entries and represents a segment of a number space corresponding to an identifier of the end host. The top level of the MRTC spans the entire number space. Each span in a level below the top level is a smaller segment than the entire number space. Each successively lower level covers successively smaller spans. Each span is clustered around one identifier of a corresponding peer. The relative proximity between the peers corresponds to the respective identifiers thereof.

When a message is to be sent from the end host to a peer having an identifier not found in the MRTC, a message is formed for delivery to the peer. The message, which includes the identifier of the peer, is addressed to another peer having an identifier that is stored in the memory of the peer and is the proximally closest to the identifier of the peer to which the message is to be sent, where 'closest' means that the Euclidean distance of the identifier space of the two peers is smallest. The proximally closest identifier is found in either one of the entries in one of the arrays or in the MRTC.

According to another exemplary implementation, a peer to peer system has a first means and a second means. Each of the first and second means interacts as a peer in a peer-to-peer fashion in the peer-to-peer system. Each of the first and second means has one or more close peers in the peer-to-peer system and each close peer has one of more neighbor peers (NP). Each of the first and second means has means for storing one identifier for each of the one or more close peers. Each of the first and second means also has means for storing an array for each of the close peers. Each array includes one of more entries. Each entry corresponds to one of the NPs and includes an identifier for the NP.

The first means can be one of the close peers of the second means. Each of the first and second means has an IP address, means for receiving updates to the identifier for the NP for each entry in each array, and means for sending an update to the IP address to each of its close peers.

When the IP address of either of the first and second means has changed, the first and second means can have a means for addressing a message for transmission to each of its NPs when communication can not be made, after a predetermined threshold, to its close peers. Here, the message will include the changed IP address. Also, the first and second means will have a means for receiving the message, extracting the changed IP address from the message, and resuming communication with its corresponding close peers using the changed IP address.

When the first and second means are close peers one to the other, and the IP address of the first means changes so as to cause a break in an on going communication between the first and second means for longer than a predetermined threshold, then each of the first and second means can have a means for addressing a message for transmission to each NP of each close peer of the other of the first and second means for delivery of the message thereto via the NP. The message will include the changed IP address thereof. The first and second means can also have a means for receiving the message via the NP, for extracting the changed IP address of the other of the first and second means from the message, and for resuming the on going communication using the changed IP address of the other of the first and second means.

Each of the first and second means can also have a means for registering an identifier thereof with each of the close peers and a means for receiving an identifier for each of the NP of each of the close peers.

According to another exemplary implementation, a method can be performed by a computer executing instructions such that computer interacts as a peer in peer-to-peer fashion in a peer-to-peer system. The method forms a transmission to register, at each peer of the computer (POC) in the peer-to-peer system, an identifier for the computer. The method also receives, at the computer, one of more messages from each of the POC, wherein each message contains an identifier for each POC, and/or an identifier for each neighbor peer of each POC (NPOP) in the peer-to-peer system. The method also registers, at the computer, the identifier for each of the POCs and the identifier for each of the NPOPs. The proximity between respective peers in the peer-to-peer system is a function of the respective identifiers thereof.

According to yet another exemplary implementation, a method stores, for an end host in a peer-to-peer system, identifiers for peers and the neighbors of the peers. When an IP address of the end host and of one of the peers changes, the changed IP address of the end host is sent to each neighbor of the peer having the changed IP address. A communication can then be received at the changed IP address of the end host from the peer having the changed IP address. The order in which the neighbors of each peer are stored can be prioritized for faster delivery of the changed IP address of the end host to the peer having the changed IP address. The proximity of the peers from each other and the end host can be a function of their respective identifiers.

Additional implementations and features will be described in the following.

BRIEF DESCRIPTION OF THE DRAWINGS

A more complete understanding of the implementations may be had by reference to the following detailed description when taken in conjunction with the accompanying drawings wherein:

FIG. 12 shows an exemplary computer used to implement a participant of a P2P system, where the P2P system includes the architecture of FIG. 6, in accordance with an implementation.

Figure 1A:
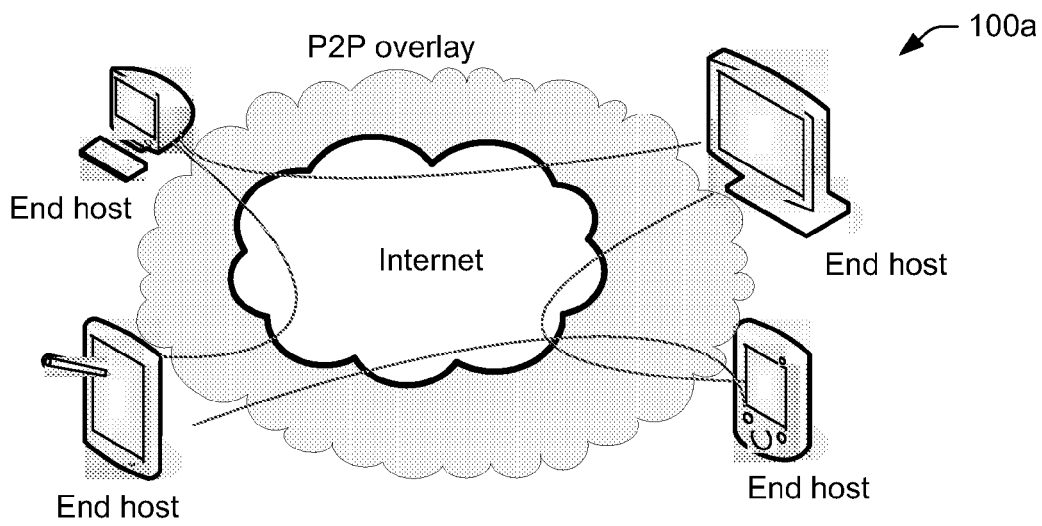
FIGS. 1a and 1b are different representations of respective peer-to-peer (P2P) systems.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The strategies described herein pertain to an overlay used in a peer-to-peer (P2P) system. The term peer-to-peer (P2P) system can describe any interconnection of participants in which the participants can directly interact with others, such as the interconnection network 100 shown in FIG. 1. In one implementation, the P2P system does not require the assistance of any server-type entities. The participants can include any kind of entity, including cellular telephones, personal computers, laptop computers, personal digital assistants, application-specific computing devices, and so on. The participants can communicate with each other via any combination of routing infrastructure, such as hardwired and/or wireless communication routing mechanisms, various routers, gateways, etc. Further, the participants can communicate with each other through any combination of network protocols, such as TCP/IP and TCP/UDP (e.g., as provided by the Internet or an intranet).

In a P2P network, an end host is assigned unique identifier or 'hostID'. This hostID is generally generated using some hash method from the IP address and/or the public key of an end host. Each end host maintains, for instance in a cache, a multilevel "routing table" cache (MRTC). By using this MRTC, the end host can decide the next peer in the P2P system that the message should be hop to in the routing of the message towards its final destination peer. The basic service provided by a P2P network is a "lookup" service. By this lookup service, the P2P network can map a "key" to an active end host in the P2P network which owns the key.

As discussed herein, a P2P network can be used to solve two issues regarding end-to-end mobility management. Namely, for resolving an IP address from a name of a peer by using the end host's name to resolve its changed IP address, and to notify the end host's peers of its changed IP address.

This disclosure includes the following: Section A describes a Peer Name Resolution Protocol (PNRP); Section B describes a Multilevel Routing Table Cache (MRTC); Section C describes End-To-End Mobility; Section D describes using a P2P network for name to address resolution; Section E describes using a P2P network for mobility message notification, Section F describes an exemplary P2P participant that can be used in a P2P network for mobility message notification as described in Section E, and Section G presents conclusions.

A. Peer Name Resolution Protocol (PNRP)

A Peer Name Resolution Protocol (PNRP) is discussed with respect to implementations of the P2P techniques disclosed. It should be noted, however, that the claimed invention can be applied to other P2P networks while using procedures other than PNRP.

In PNRP, each peer, node, or user is assigned a unique identifier or 'PNRP ID'. Using the MRTC, as discussed below with respect to FIG. 3, each host is able to route a message to the next hop whose PNRP ID is numerically closer to the key carried by the message, as illustrated in FIG. 2.

Figure 2:
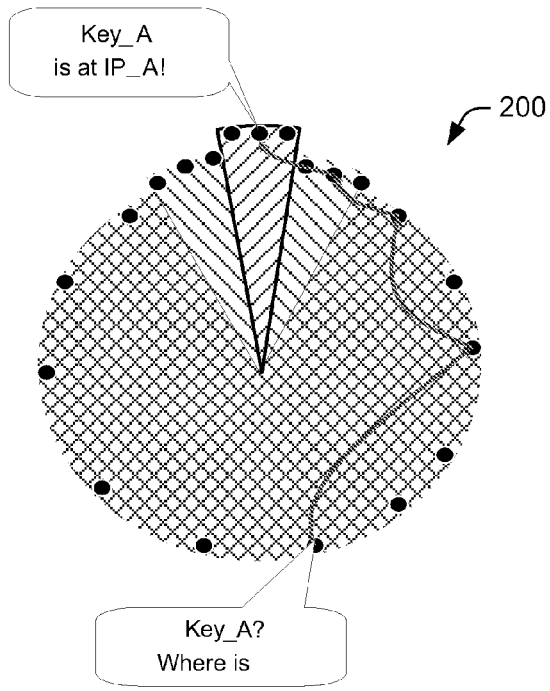
FIG. 2 shows a P2P technique in which an end host routes a message progressively closer to a destination peer, where each successive peer has an identifier that is proximally closer to that of the destination peer, and where that identifier of the destination peer is carried in the message.

As show in FIG. 2, a P2P network has an end host that asks for the IP address of a node A. To do so, the end host knows the PNRP ID of node A. The technique shown in FIG. 2 uses the PRNP ID of node A, shown as 'Key_A', to route a message progressively closer to node A. Each successive peer to which the message is passed (i.e., 'hopped') has a PRNP ID that is proximally closer to that of the Key_A. Note that Key_A is carried in the message that is passed from peer to peer. When one of the peers knows the IP address that corresponds to Key_A (e.g., IP_A!), then the message can be routed at node A.

B. Multilevel Routing Table Cache (MRTC)

Figure 3:
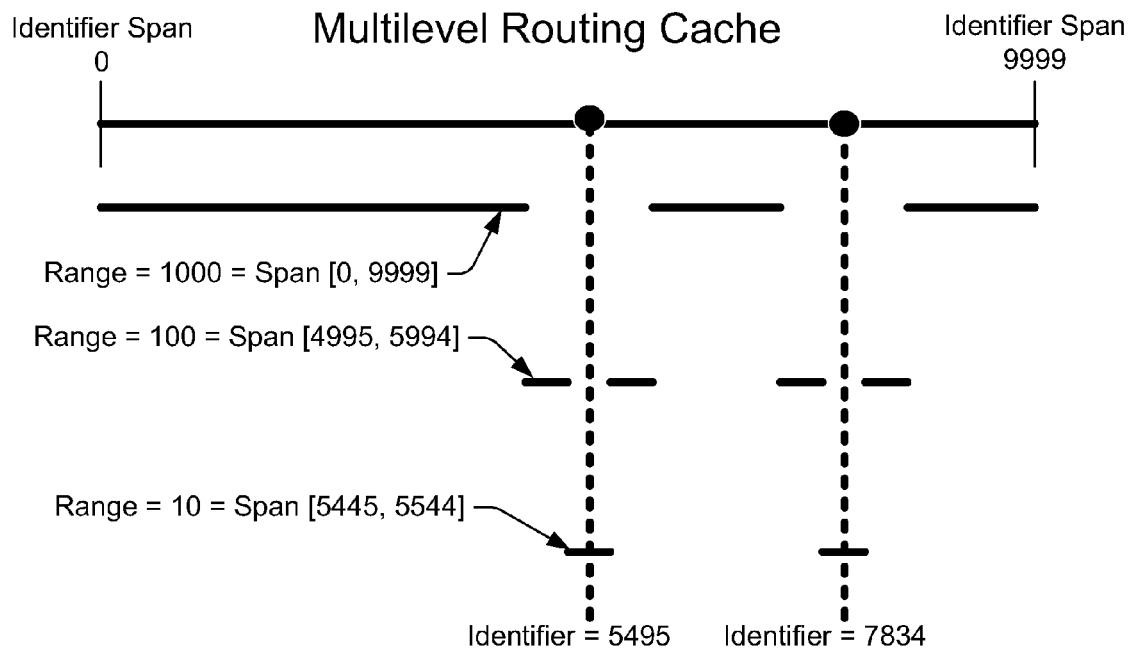
FIG. 3 is a graphical representation of a multilevel routing table cache (MRTC) that is maintained by an end host in a P2P system, where identifiers corresponding to peers of the end host are hierarchically represented in the MRTC such that the MRTC can be used by the end host to decide the next peer to route the message to that is closer to the peer for which the message is intended.

The MRTC, as illustrated in FIG. 3, is a PNRP cache representing knowledge about select participants (i.e., peers) in the P2P network. An end host computer maintains a separate MRTC. From the perspective of the MRTC, each peer in the MRTC contains a PNRP ID and an IP address (i.e., a PNRP network endpoint). While FIG. 3 shows a node having two PNRP IDs in one PNRP design implementation, other PNRP design implementations only need one PNRP ID for a node.

The MRTC is maintained as a multi-level structure. Each level represents a segment of the total PNRP ID number space. The top level of the cache spans the entire number space. The next level down spans a smaller segment of the number space, clustered around a locally registered PNRP ID. Each subsequent level spans a progressively smaller part of the number space, always around the same PNRP ID. There are a maximum number of entries allowed at each cache level.

As a peer learns about other peers, the peer adds the other peer's PNRP ID and IP address to its MRTC. The level of the MRTC for the new peer is chosen based on the distance between its local PNRP ID and the new PNRP ID. If the peer adds the new peer to the lowest level of the MRTC but the lowest level is already full, then a new lowest level is added to the MRTC. If it adds the new peer to some other level and the level is already full, it replaces an existing entry with the new entry or discards the new entry. Periodic maintenance of the MRTC must be done to ensure it is valid. For example, peers that have expired are removed from the MRTC.

As seen in FIG. 3, the MRTC shows a cache with a number space having a range of 10000 that spans from 0 to 9999. Though not drawn to scale, the number space seen in FIG. 3 has locally registered PRNP IDs 5495 and 7834. The second cache level has a range of 1000 spanning from 4995 to 5994. The third cache level has a range of 100 spanning from 5445 to 5544. The second and third of the three (3) depicted cache levels in the MRTC both cover 1/10th of the number space of the previous cache level. In this case there are three (3) levels for each identifier (e.g., PNRP_ID), but each identifier's cache view shares the top level. The MRTC is structured, as shown in FIG. 3, to help ensure that name resolution takes $O(\log_k N)$ hops on average to resolve an IP address from a name or identifier, where 'k' is the factor by which each cache level's scope is reduced, and N is the number of identifiers in an identifier naming space for the MRTC.

PNRP relies on a cloud of transient nodes to resolve each identifier (e.g., PNRP_ID) into respective IP addresses. The PNRP protocol ensures that, once joined to a PNRP cloud, a node can successfully register and resolve PNRP ID's until it chooses to leave the cloud. Like any discovery protocol, PNRP requires a method of 'bootstrapping' to learn enough to participate in resolution. Bootstrapping requires a new PNRP node to find another node already in the cloud. The process of finding such a node is called cloud discovery. If cloud discovery fails, a PNRP node assumes it is the first PNRP node in the cloud.

C. End-To-End Mobility

Figure 4:
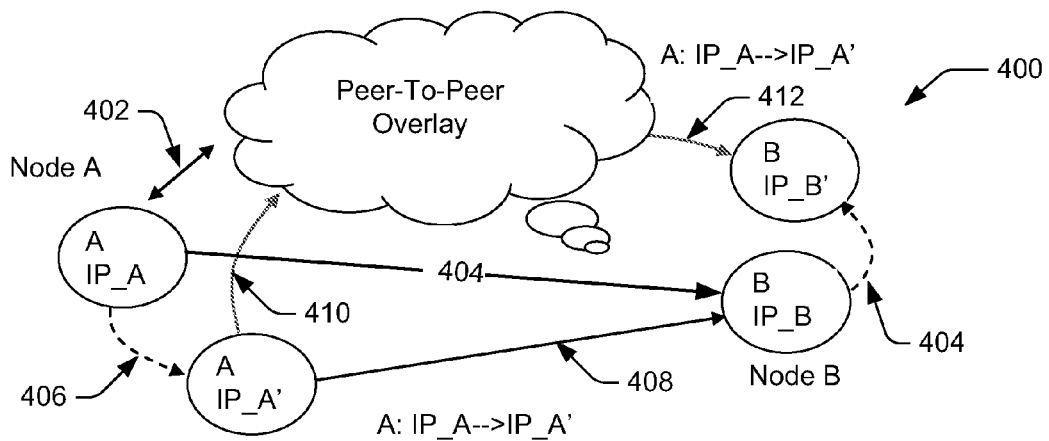
FIG. 4 shows a P2P system having an end-to-end mobility architecture, where each peer is assigned a unique identifier corresponding to a Peer Name Resolution Protocol, and where a P2P overlay maintains the mapping of the unique identifier to an IP address for each node.

FIG. 4 shows a P2P system having an end-to-end mobility architecture relative to a computing device A and a computing device B. Each peer (e.g., node) in the P2P system is assigned an identifier (e.g., 'PNRP ID'). A P2P overlay maintains the mapping of the PNRP ID to a respective IP address for each node (e.g., computing device in the P2P system). As shown in FIG. 4, suppose node A is a mobile device having an IP address of 'IP_A'. The identifier for node A would be used to setup a connection with node B. At arrow 402, mobile node A looks up the IP address of B using the identifier for node B via the Peer-to-Peer Overlay seen in FIG. 4. This lookup can be an access to the MRTC at mobile node A that uses the identifier for node B. The P2P overlay resolves the identifier for node B to node B's current IP address (e.g., 'IP_B'). The mobile node A uses the returned address 'IP_B' to setup connection with node B as shown by arrow 404. When mobile node A moves to a new place and changes its IP address from IP_A to IP_A', as shown by arrow 406, mobile node A directly notifies node B (IP_B) of its new IP address, as indicated by the line 408. In the case where the notification cannot be sent directly to node B, such as where node B changes its IP address simultaneously with a change of the IP address of mobile node A as seen at arrows 404-406, then mobile node A sends the notification of the new IP addresses via the P2P overlay such as has been indicated by the arrows 410-412.

D. Using a P2P Network For Name To Address Resolution

Figure 5:
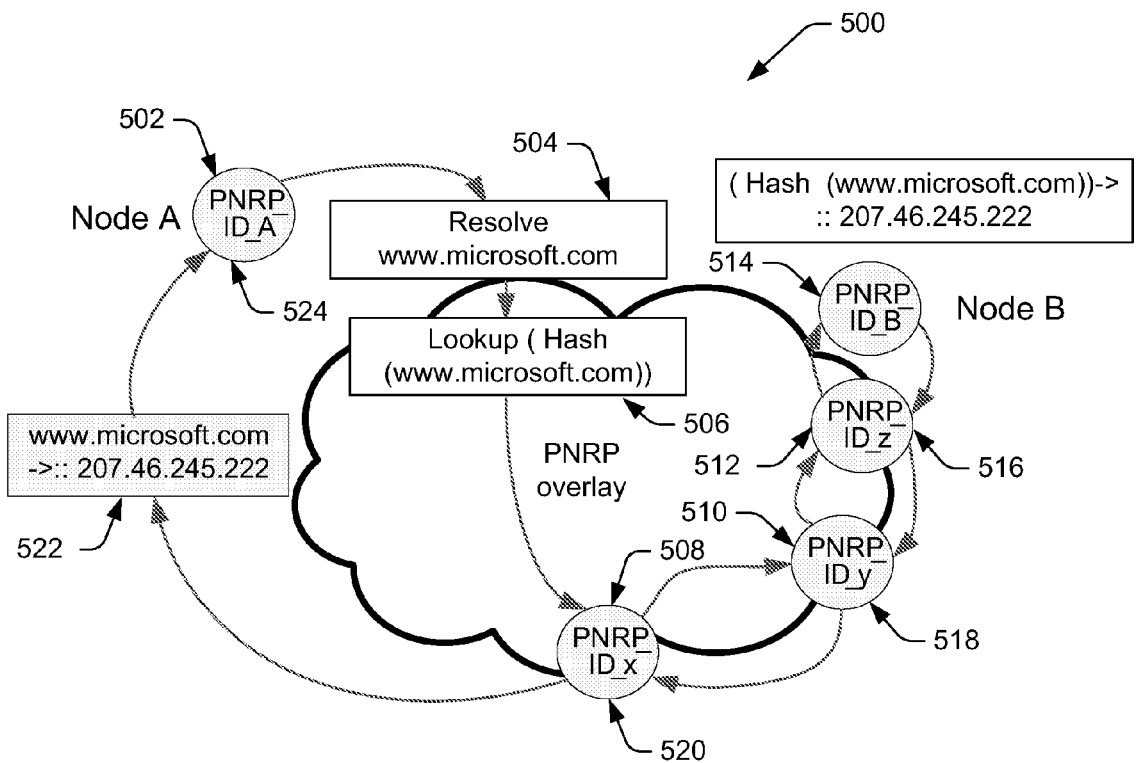
FIG. 5 shows a P2P network having an overlay that uses an identifier of a peer in a technique to resolve the IP address of the peer, where each end host participates in the P2P network by telling other peers its identifier and its IP address, and where the overlay is used to route a message to a destination peer, hop by hop, to successively closer peers until the message reaches the destination peer.

FIG. 5 shows a P2P network having a PNRP overlay. The PRNP overly uses a PNRP ID of a peer to resolve the IP address of the peer. Note that each end host participates in the P2P network by telling other peers its identifier (e.g., PNRP ID) and its IP address. The PRNP overlay is used to route a message to a destination peer, in a 'hop by hop' sequence via progressively closer peers, until the message reaches the destination peer.

When a computing device in a P2P network is mobile, its IP address can change. A change in the IP address can cause a communication to be broken. To restore communication, an identifier for a computing device can be used, in conjunction with the overlay for the P2P network, to resolve an IP address for the computing device. An exemplary environment for name to IP address resolution is seen in FIG. 5.

When a source peer node would like to get the current IP address of a destination peer node, the source peer node issues a resolve message to the PNRP overlay seen in FIG. 5. The resolve message includes a key that is hashed from the user friendly identifier (e.g., the name) of the destination peer node. The PNRP overlay will route the resolve message to the destination peer node, hop by hop to peer nodes in the P2P network, until the message reached the destination peer node. The number of hops traversed by the message among the peer node is expected to be O(log$_K$N) in average, where N is the number of the active nodes in the PNRP overlay and K is the number of entries in each cache level of the MRTC at the source peer node.

As shown in FIG. 5, suppose node A would like to resolve the IP address of the Web site "www.microsoft.com" as shown at 502. To do so, node A calls "resolve(www.microsoft.com)" at block 504. This resolve command is provided by a PNRP module 620 discussed below with respect to FIG. 6. The PNRP module 602 hashes the Web site "www.microsoft.com" into a key as shown at block 506. This key is then used as a lookup to the next node, which is numerically nearest to the key from the point view of node A which, in this case, is indicated to be a node x by the identifier PNRP_ID_x seen at 508 in FIG. 5. The foregoing scenario is only for the case where the destination node PNRP ID is not generated with its public key. The general case, however, can be expressed as "Peer name=<authority>.<classifer>, and unsecured Peer name=0.<classifier>", where the <authority> is generated from the public key.

Node x, represented by identifier PNRP_ID_x, forwards the lookup to node y represented by the identifier PNRP_ID_y at 510 using the same routing algorithm that was used to forward the lookup to node x. Node y forwards the lookup to node z represented by the identifier PNRP_ID_z at 512 using the same routing algorithm that was used to forward the lookup to node y. Node z forwards the lookup to node B at 514. Node B has access to information that the key in the message maps to the IP address: ::207.46.245.222 for the Web site "www.microsoft.com".

Node B then returns the result to PNRP_ID_z at 516. PNRP_ID_z returns the result to PNRP_ID_y at 518. PNRP_ID_y returns the result to PNRP_ID_x at 520. PNRP_ID_x returns the result at 522 to node A at 524. As such, the procedure for resolving an identifier of a peer to an IP address for the peer is finished (e.g., a name to IP address resolution procedure).

Figure 6:
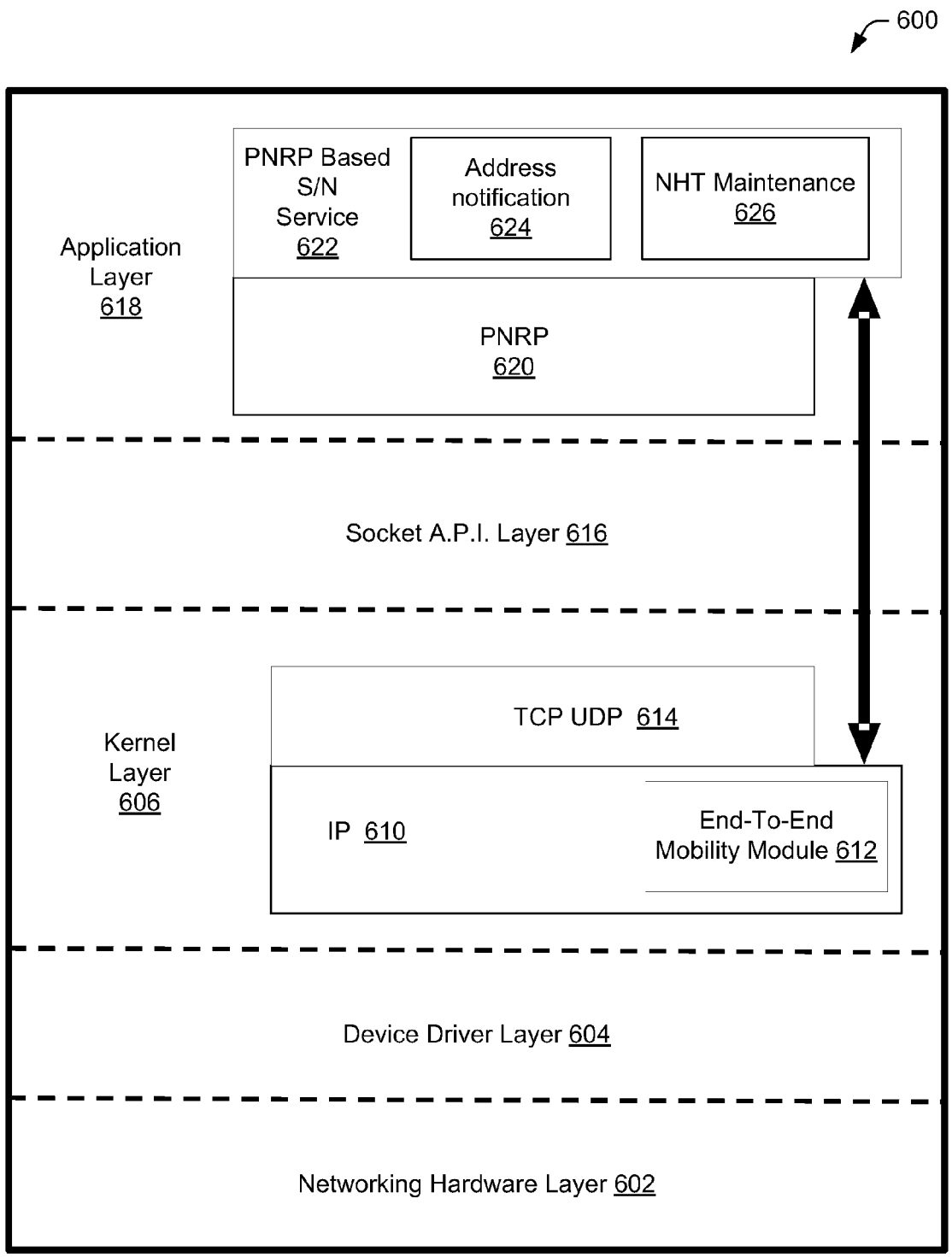
FIG. 6 is a schematic diagram of an example layered TCP/UDP implementation incorporating an architecture that uses a P2P Name Resolution Protocol (PNRP) based Subscription/Notification (S/N) service in conjunction with an end-to-end mobility module, where the architecture helps end-to-end mobility, in accordance with an implementation.

As discussed with respect to FIG. 5, the name to IP address resolution procedure can use a PNRP module 620 seen in FIG. 6. FIG. 6 is a schematic diagram that provides an exemplary layered TCP/UDP implementation. The layered TCP/UDP implementation incorporates an architecture 600 that uses a Peer Name Resolution Protocol (PNRP) based Subscription/Notification (S/N) 622 service in conjunction with an end-to-end mobility module 612 seen in FIG. 6. The architecture 600 assists in achieving desirable end-to-end mobility, as explained below.

In the implementation depicted in FIG. 6, a protocol for establishing and maintaining communication connections in a computer network may be implemented by multiple protocol layers, for example, corresponding to layers described by an Open Systems Interconnect (OSI) model of the International Standards Organization (ISO). For details of an OSI model see Zimmerman, OSI Reference Model—The ISO Model of Architecture for Open System Interconnection, IEEE Transactions on Communications, April 1980. In what follows, examples are described with reference to the Internet Protocol (IP) and IP-based protocols, however, embodiments of the invention are not so limited, and the examples may be generalized to any networking protocol with stateless routing.

FIG. 6 illustrates an example scheme for an application layer 618. The application layer 618 resides on the other networking layers 602-616. Examples of the other networking layers 602-616 include a physical layer that determines the formatting of signals in a physical medium (not shown), and a medium access control (MAC) layer (not shown) that controls access by multiple computers (e.g., peer computers 102-112 of FIG. 1b) to a shared physical communications medium. Further examples of other network layers 602-616 include a session layer (not shown) that enforces user-based authentication dependent policies, and a presentation layer (not shown) that translates data from a common network transmission format to a particular application format.

The application layer 618 utilizes network services by interacting with the other networking layers 602-616. At least one of the networking layers 602-616 interacts with the physical transmission medium. FIG. 6 shows a layered TCP/IP implementation where a device driver layer 602 provides an interface to a networking hardware layer 602 and to a kernel layer 606 at an IP (Internet Protocol) layer 610. The IP layer 610 processes data as it implements Internet Protocol functionality independent of layers 616 and 618. IP layer 610 includes the end-to-end mobility module 612 discussed above. A TCP (transmission Control Protocol) UDP (connectionless User Datagram Protocol) layer 614 interfaces the IP layer 610 and is included in the kernel layer 606 to implement transmission control aspects of a TCP/IP. TCP UDP layer 614 serves as a transport layer to interface with a network socket application programming interface (API) layer 616. The socket API layer 616 is utilized by the application layer 618 to access computer network services.

Under different scenarios, communication peers in a P2P system can lose communication one to other, such as is common when one or both of the peers is a mobile computing device These mobility scenarios cannot be solved by conventional basic end-to-end communications between two communication peers. One example occurs in the case where both communication peers change their respective IP addresses simultaneously. Another example occurs in the case where a correspondent peer is behind a Network Translation (NAT) box such that the address update messages cannot be delivered to the correspondent peer directly. Implementations include the PNRP based S/N service module 622 in the application layer 618 to handle these mobility scenarios. Further, the P2P network can be used to decentralize the subscription/notification (S/N) service provided by the PNRP based S/N service module 622 so that the whole mobility scheme is based on end hosts which have identical functionalities.

The main function of the PNRP based S/N service is to notify the communication counterparts after a host changes its IP address in situations where the basic end-to-end connection maintenance protocols fail, e.g., simultaneous movement resulting in IP address changes at both ends. Since the communication relationship is always mutual, the "subscription" is implicated in the PNRP based S/N service. In other words, every host shall subscribe to the IP address change event of all its communication peers. Rather than explicitly developing a subscription operation, every host will register its communication peers locally. When the IP address of a host changes, notifications of the new address are sent out by the PNRP based S/N service to all registered hosts. An exemplary procedure by which each hosts registers its communication peers locally is discussed below with respect to FIG. 9.

Each notification is in the form of a PNRP message. When receiving such a notification message, the PNRP module 620 in the application layer 618 will send an indication to the PNRP based S/N service module 622 also in the application layer 618. Then, the PNRP based S/N service module 622 can parse the message to extract therefrom the embedded new IP address. This new address is then passed to the end-to-end mobility module 612 in the kernel layer 606 which utilizes the information to resume the original connection. It is worthy to note that the PNRP based S/N service module 622 may be triggered when the basic end-to-end module 612 in the kernel layer 606 cannot resume the connection, or triggered simultaneously when the end-to-end module 612 sends address notification at the IP layer. Which methods to use are decided whether the application is delay sensitive. For instance, if the application is not delay sensitive, when the basic end-to -end module 612 sends out a binding update message to a peer to which the host has established a communication session after a timeout event has occurred without receiving an acknowledgement message, the end-to-end module 612 will ask the PNRP based S/N service module 622 to help in the delivery of the binding update message so as to restore the communication session between the host and the peer.

The PNRP based S/N service module 622, found in the application layer 618 on every end host, should register one and only one identifier (e.g., PNPR ID) for each of its communicating peers in its MRTC so as to be coordinated with the P2P overlay (e.g., a PNRP cloud). This registration process is discussed below with respect to FIG. 9. An optional way for the end host to register its communication peers is to assign a unique peer name using the PNRP based S/N service module 622 in the application layer 618 as "PNRP Mobility S/N service". Therefore, the identifiers (e.g., PNPR IDs) of the end hosts can be differentiated by their service location, which is unique for all end hosts and should be independent of the IP address.

E. Using a P2P Network For Mobility Message Notification

Figure 7:
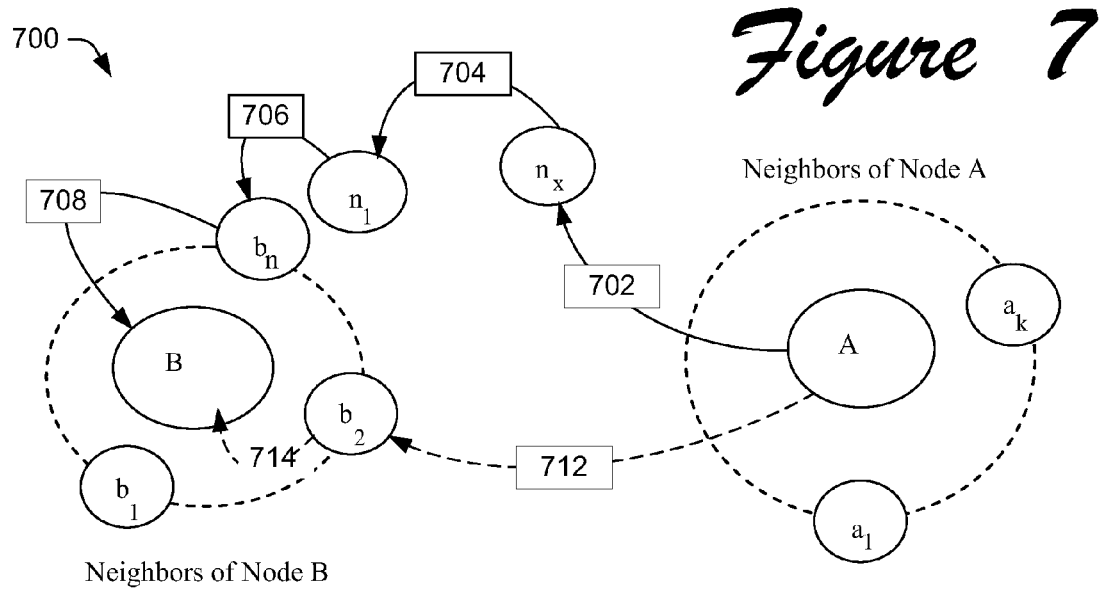
FIG. 7 shows a P2P network having an overlay, where each end host keeps a neighbor hints table (NHT) to store addresses for the neighbor peers of its peers, where the NHT can be used to create short-cuts to deliver notification messages to the peers of the end host, in accordance with an implementation.

FIG. 7 shows a P2P network having an overlay, where each end host keeps a neighbor hints table (NHT) to store addresses for the neighbor peers of its peers, where the NHT can be used to create short-cuts to deliver notification messages to the peers of the end host.

Currently, the convention PNRP discussed above needs $O(\log_k N)$ steps (e.g., hops) in order to forward a message from an end host to it destination peers. Conventional notification forwarding is seen by the solid arrows 702, 704, 706, and 708 in FIG. 7. The latency inherent in conventional PNRP may be too large for end-to-end mobility which is time-critical. To decrease the latency of PNRP, a neighbor hints table (NHT) can be constructed to accelerate the notification.

E.1 Neighbor Hints Table (NHT) Concepts

A Neighbor Hints Table (NHT) is a specifically designed data structure for the PNRP based S/N service (e.g., having functionality of the PNRP based S/N service module 622). The PNRP based S/N service module 622 interfaces with an NHT maintenance module 626 that is also in the application layer 618. The NHT maintenance module 626 maintains an NHT for each registered communication peer of an end host. The NHT contains the address information (e.g., PNRP ID, IP address, and port number) for each neighbor host of the registered peers (NPOP). Each neighbor of a peer has an identifier that is numerically close to the peer. Complying with the PNRP's definition, 'neighbors' in PNRP are hosts that are cached at the lowest cache level of the MRTC, such as are seen in FIG. 3. With a high probability, the neighbor relationship is symmetric, which means neighbors are caching information mutually. Therefore, with a high probability, any message is only one (1) hop away if the message reaches the destination's neighbors. In the PNRP based S/N service 622 in the application layer 618, the "neighbor" information stored in the NHT is used to reduce the number of hops between peers that are needed in order to perform the notification function, such as when an IP address of a mobile peer has changed. As such, the PNRP based S/N service shortcuts the PNRP routing of the notification message. By transmitting the notification message directly to destination peer's neighbors, the notification messages can reach the destination peer within just two (2) hops, as illustrated by the dashed arrows 712-714 in FIG. 7. Furthermore, to increase the probability that the nodes in the NHT will participate in the process of forwarding or relaying notification messages to communicating peers, non-peer-neighbor nodes can also be added to the NHT. For example the user of a mobile laptop can add a desktop that is not a peer neighbor in the P2P network (e.g., the desktop PC is not a peer neighbor for the mobile device) as a peer neighbor of the laptop by adding the peer ID and the IP address of the desktop to the lap top's NHT. Here, the non-peer neighbor desktop is an always-on personal computer (PC) which is unlikely to change its IP address due to its absence of mobility.

To increase the probability that the notification message can reach the destination peer from the originating end host within just two (2) hops, the following two (2) conditions should be met (e.g., where an End Host A and a node B are communicating). First, the end host A should accurately know each neighbor peer of node B. Second, the peer neighbors of B (e.g., nodes $B_1, B_2, \ldots B_n$) on the neighbor lists of node B should accurately know node B's IP address. The first condition is fulfilled by the NHT maintenance procedure performed by the NHT maintenance module 626, which is described below. The second condition is fulfilled by the PNRP protocol since, after a node gets a new address, the PNRP service in that node will send the new IP address to each of its neighbors.

E.2 Registration of Peers

Figure 9:
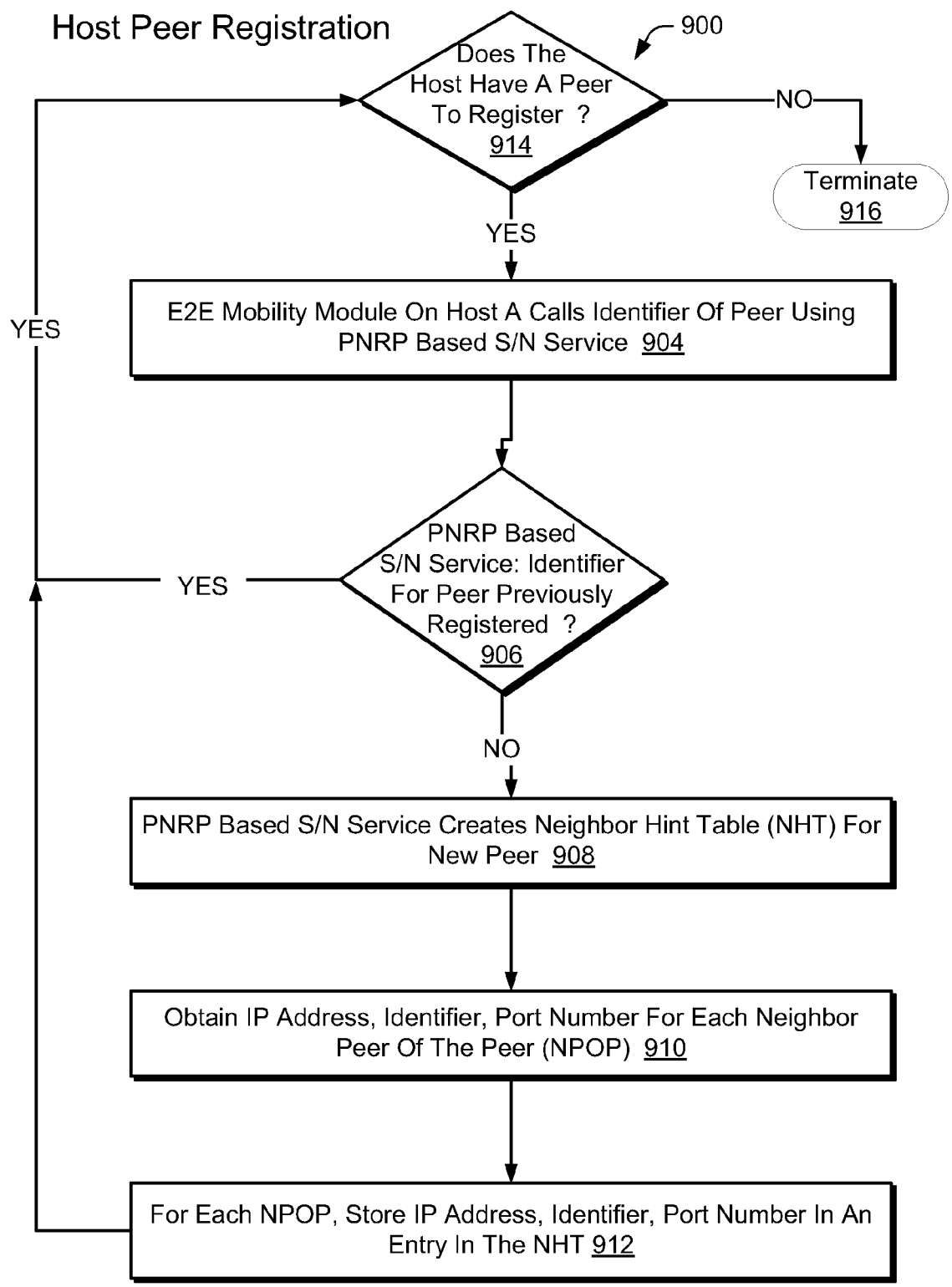
FIG. 9 is an exemplary procedure depicted in a flowchart by which, in the illustrated implementation, an end host registers its communication peers in its local PNRP based S/N service as shown in FIG. 6, when the connection is established with the communication peers, in accordance with an implementation.

An end host can register its communication peers using an exemplary procedure 900 depicted in FIG. 9. Procedure 900 is a local PNRP based S/N service, as discussed with respect to the PNRP based S/N service module 622 seen in FIG. 6. As discussed above, an end host should register its communication peers in its local PNRP based S/N service when a connection with the end host is established with the peer to be registered. For example, for the purpose of discussing procedure 900 in conjunction with FIGS. 6 and 9, assume host A registers host B in A's local PNRP based S/N service.

At a query 914, it is determined that host A is to register peer B and control of procedure 900 moves to block 904. If, however, no peer is to be registered, procedure 900 terminates at block 916. At block 904, the end-to-end mobility module 612 in the IP layer 610 of kernel layer 606 enables host A to call a register (pnrp_id) primitive of the PNRP based S/N service using the PNRP based S/N service module 622. Here, pnrp_id is the PNRP ID of host B. At a query 906, the PNRP based S/N service module 622 checks whether the pnrp_id has been registered before. If the pnrp_id is not new, procedure 900 returns to query 914. If the pnrp_id is new, the PNRP based S/N service module 622 creates a neighbor hint table (NHT) for it at block 908. The NHT is an array containing the IP addresses and PNRP ID of the neighbor hosts of host B.

The PNRP based S/N service module 622 in the application layer 618 on the host A initializes an NHT maintenance operation by interfacing with the NHT maintenance module 626. By this operation, the newly created NHT is filled the entries for the NHT. Details of the NHT maintenance module 626, and operations thereof, are described in the next section.

E.4 Neighbor Hints Table (NHT) Structure

An NHT can be used to create short-cuts to deliver notification messages to communicating peers. The NHT is updated by the maintenance procedure conducted by the NHT maintenance module 626. Normally, all the addresses in the NHT are PNRP-neighbors of the peer. However, a node can also add an address of a non-PNRP neighbor as an entry in the NHT of its peer if the non-PNRP neighbor is more suitable to relay notification messages.

Before the neighbor addresses are used to construct the NHT, the end host can first sort those addresses according to some priority rules or priority algorithms. By prioritizing the order in the NHT, there will be a faster relaying of the notification messages. For example, a neighbor with a higher level of trust may be preferred over a neighbor with less trust, and a neighbor with less mobile probability may be preferred over a neighbor with higher mobile probability.

Figure 8:
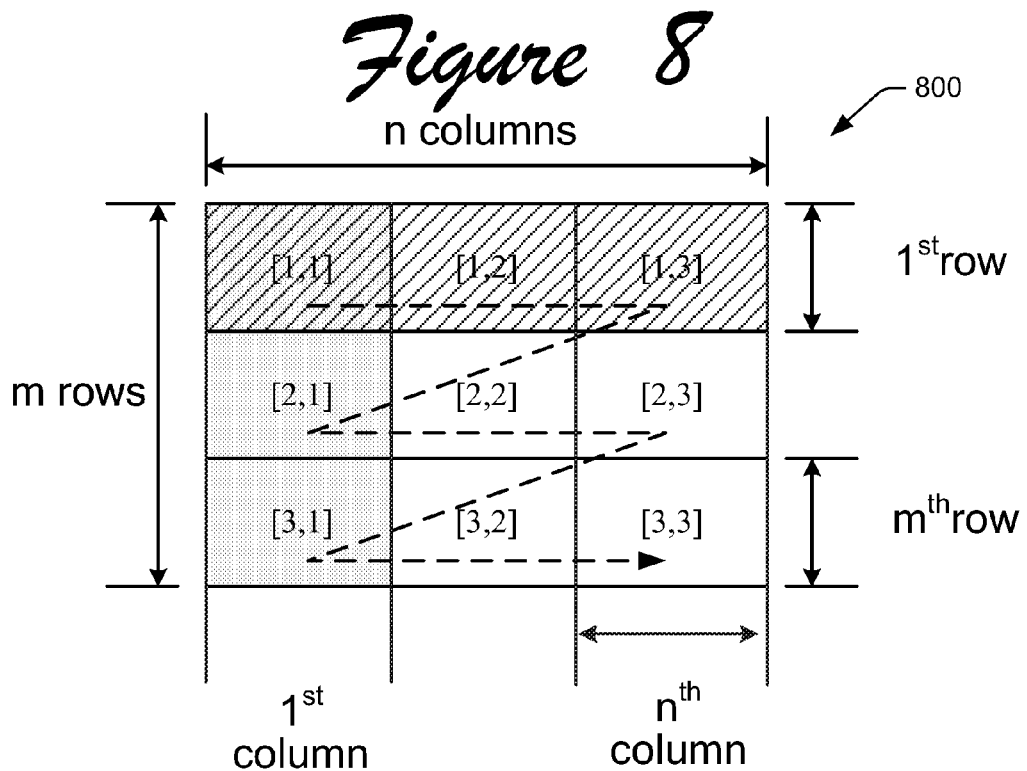
FIG. 8 shows an exemplary embodiment of the NHT of FIG. 7.

The NHT address array is arranged as a matrix with m rows and n columns, an exemplary embodiment of which is shown in FIG. 8. The entries of this array are filled from the first row one by one from the sorted address information provided by the PNRP based S/N service module 622. For example, suppose m=3 and n=3, then the NHT address arrays are filled according to the sequence [1,1],[1,2],[1,3],[2,1],[2,2] . . . [3,3], as shown by the dashed arrow in FIG. 6.

As is described in the following sections, the value setting of m and n is a tradeoff between latency and traffic overhead. An example is that The NHT can be used by column, which means a column constructs a cluster of possible relaying nodes for a notification message. The nodes in the same column will be tried sequentially from a low numbered row to a high numbered row. For example, as to the 1st column, the nodes will be tried according to the sequence [1,1], [2,1], [3,1], which is shown by the shaded first column in FIG. 8. The NHT can also be used by row, which means if the nodes will be tired row by row.

E.5 Maintenance of the NHT

Figure 10:
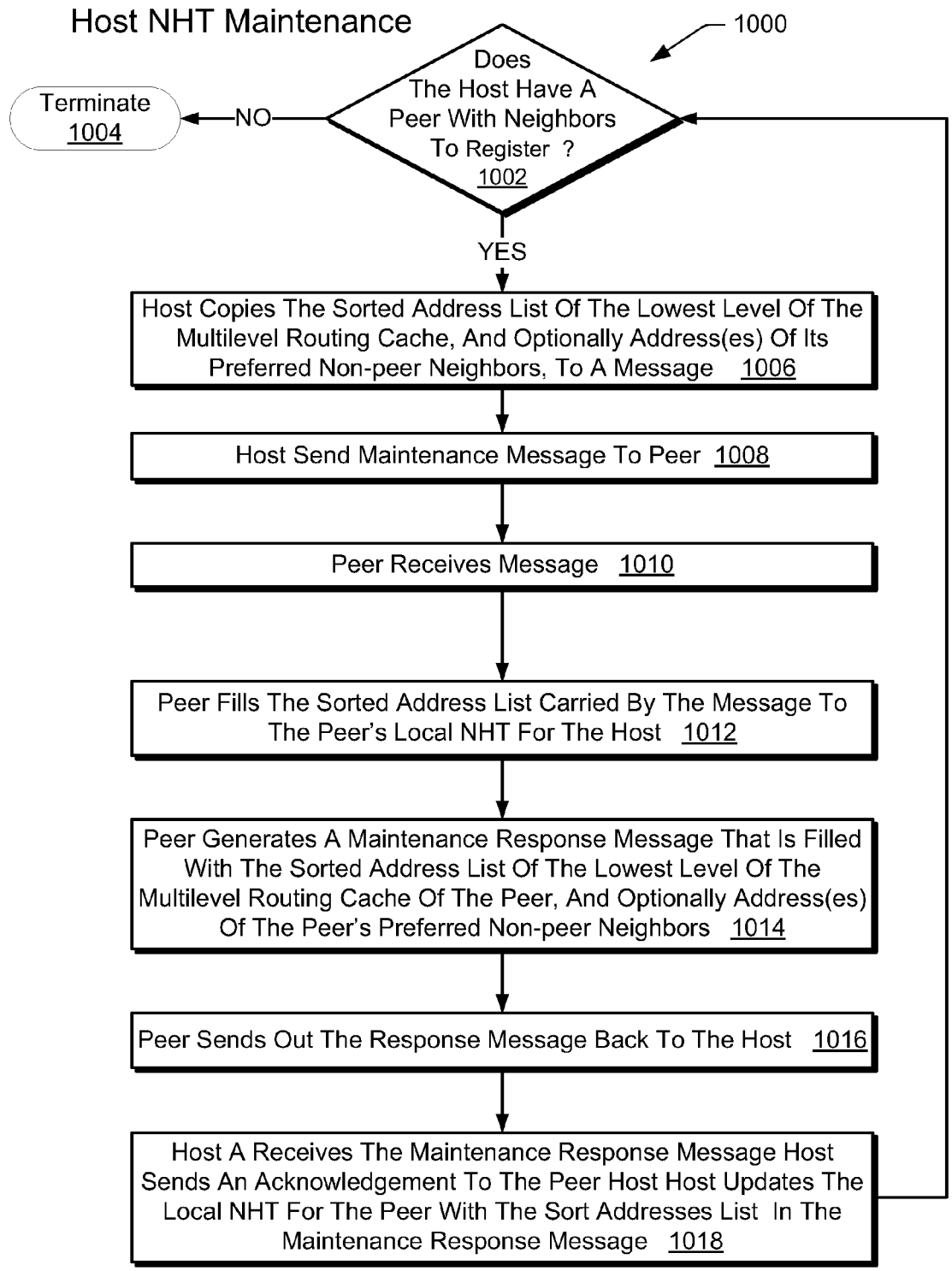
FIG. 10 is an exemplary procedure depicted in a flowchart by which, in the illustrated implementation, an end host updates each of its NHTs, where the update maintenance on the NHTs is performed in the PNRP based S/N service by sending maintenance messages to the peers that communicate with the end host, in accordance with an implementation.

The maintenance of NHT is discussed below in reference to the NHT maintenance module 626 in the application layer 618 of FIG. 6 and in reference to a process 1000 seen in FIG. 10. The objective of maintaining the NHT with the NHT maintenance module 626 is to keep the nodes in the NHT up-to-date. The maintenance is performed by the PNRP based S/N service module 622 by sending maintenance messages. Assume host A has a peer (a registered host B) with neighbors to register as determined at a query 1002. Otherwise, process 1000 terminates at block 1004. To register the neighbors of A's peer to the registered host B, host A sends a maintenance message to the registered host B. To do, host A copies to the message the sorted addresses list of its lowest level cache of the MRTC of host A. Host A may also optionally copy some non-PNRP neighbors that are preferred by A to the message. This maintenance message is sent directly to host B at block 1008.

Upon receiving the maintenance message at block 1010, control of process 1000 moves to block 1012 where the peer B fills addresses carried by the message to its local NHT for host A. Then, at block 1014, host B generates a maintenance response message, fills the message with the sorted addresses of hosts in B's lowest level cache of its MRTC, optionally also fills the message with some non-PNRP neighbors preferred by B, and then sends out the response message back to the host A at block 1016.

When host A receives the maintenance response message at block 1018, host A first sends an acknowledgement to the host B and then end host A updates its NHT for the host B with addresses in the message. Control of process 100 can then return to query 1002.

After the maintenance message delivery, the NHTs of host A and host B are updated. As described, a node can also use non-PNRP neighbors for entries in the NHT. If non-PNRP neighbors are used, when a node changes its IP address, the changed node needs to send its new address to those preferred non-PNRP-neighbor nodes.

In order to keep the NHT up-to-date, an efficient maintenance scheme can be implemented by the PNRP based S/N service module 622. This maintenance scheme can combine both periodic maintenance and trigger-based maintenance.

In normal cases, the PNRP based S/N service module 622 can periodically send out a maintenance message to each of the registered hosts that are registered with the host that is sending the message. The main reason for periodic maintenance is that the PNRP may not rigorously monitor the neighbor peer information and the neighbor peer information may become out-of-date. The maintenance period can be predetermined according to requirements of application layer 618.

For example, for an end-to-end mobility scenario, if the mean lifetime of each host is on the order of hours, a short time period such as 10 minutes can be predetermined to be the period of maintenance. Note that when the entries in the NHT are sorted according to the priorities, the maintenance period of high priority entries should be shorter than those of lower priority entries. Furthermore, to reduce extra traffic, the periodic maintenance period of some entries in the NHT can be configured as infinite, which means that no periodic message needs to be sent to those nodes because some nodes can be assumed to be non-mobile and long-lived, such as a desk-top PC that belongs to the same user.

In some cases most high priorities neighbors in the NHT can become unavailable before the next round of periodic maintenance. In this case, a trigger-based maintenance can be performed to keep the NHT up-to-date. The PNRP based S/N service module 622 can actively monitor the availability of the neighbors of a peer. When this monitoring detects a considerable modification at the lowest cache level of the MRTC, for example, if the neighbors in the first row of the NHT have been changed or have become disabled, a host can actively send a maintenance message to update the NHT of its peers.

E.6 Notification

Figure 11:
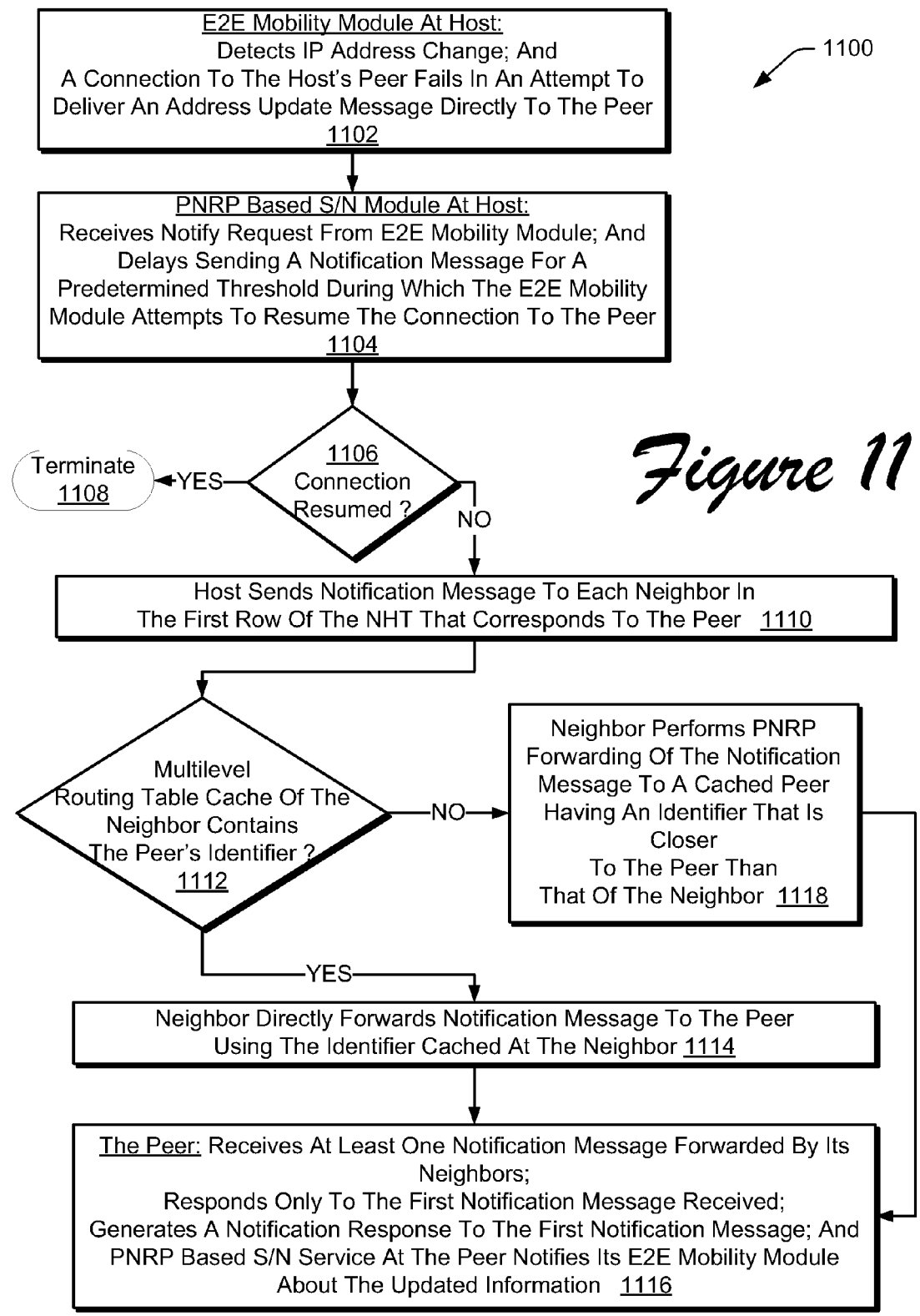
FIG. 11 is an exemplary procedure depicted in a flowchart by which, in the illustrated implementation, a notification is issued when the end-to-end mobility module of the end host detects an IP address change of the end host and the end-to-end module fails to deliver an address update message to its peer directly, where the end host can send a notification to a peer within two hops via the PNRP based S/N service, in accordance with an implementation.

A notification message can be issued when the end-to-end mobility module 612 in the kernel layer 606 detects an IP address change and the end-to-end module 612 fails to deliver an address update message to its peer directly as determined at block 1102 of a procedure 1110 seen in FIG. 11, or the end-to-end module 612 needs to deliver the update message together with the PNRP based S/N to increase the probability of successful delivery. The delivery of the notification message is discussed in this section in reference to the NHT maintenance module 626 in the application layer 618 of FIG. 6 and in reference to the procedure 1100.

Assume host A sends a notification message to a host B via the PNRP based S/N service module 622, the notification procedure set forth in procedure 1100 moves to block 1104. At block 1104, a notify request that is sent from the end-to-end mobility module 612 is received by the PNRP based S/N service module 622. The PNRP based S/N service module 622 delays the sending of a notification message for a predetermined threshold (e.g., a predetermined time period which, for instance, can be zero). If it is determined at a query 1106 that the end-to-end mobility module 612 could resume the connection successfully during this predetermined threshold, then procedure 1100 terminates at block 1108 and the notification procedure is canceled. Otherwise control of procedure 1100 moves to block 1110.

At block 1110, the host A sends a notification message to each neighbor in the first row of the NHT for host B. At block 1112, a query determines whether the MRTC of the neighbor contains the peer's identifier. If not, procedure 1110 moves to block 1116. Otherwise, for instance, a certain host $B_1$ is one of B's neighbors and that host $B_1$ will receive the notification message. With a high probability, the IP address (e.g., network end-point) of the host B will be cached in $B_1$'s local MRTC (e.g., PNRP cache). If that is the case, then the notification message is forwarded to the host B directly at block 1114. Otherwise, at block 1118, $B_1$ will perform a normal PNRP forwarding operation and forward the notification message to a cached host which is closer to the destination or target host B. To control the PNRP routing behavior, the host A could set the maximum number of hops that the notification message can traverse, such as setting this to be a predetermined threshold of the number 2. Therefore, if some node fails to forward the notification message, the host A can try other entries in the same column of the NHT but with a lower priority, unless the failed node is the lowest priority node in the same column. Another optional way here is to try all of the entries in the NHT, row by row. This means that only after all the entries in the first row in the NHT have failed, then the second row in the NHT will be tried.

At block 1116, the destination or target host B receives one or more notification messages forwarded by its neighbors. Host B should only respond to the first message that it receives and should ignore all of the other successive messages that it receives with the same information. A notification response message is generated to respond to the first notification message. Then, the PNRP based S/N service module 622 on the host B notifies the end-to-end mobility module 626 about the updated information.

In normal cases, the notification message forwarded by the peer to its NHT neighbors can reach the destination or target host within two hops. This message delivery via the NHT short-cut technique can reduces the latency of the notification service provided by the PNRP based S/N service module 622.

The advantages of delayed notification at block 1104 is two fold: First, if the end-to-end mobility service module 612 could resume the connection, which means only one node changes its address, then there is no need to send notification by the PNRP based S/N service module 622. While FIG. 11 illustrates that the delay can be implemented in the PNRP based S/N service module 622, the delay can alternatively be implemented in the end-to-end mobility module 626. The delay of the predetermined threshold increases the probability that host B will update its own new information at its neighbors before the neighbors will be receiving notifications from host A. Therefore, the predetermined threshold increases the probability for a successful notification message.

The notification messages are clustered based on the number of columns of the NHT. At one time only, one entry in a cluster will be tried. So, in the given example, the number of simultaneous messages is the number of columns of the NHT, where there are n=3 simultaneous messages sent.

The choice of the variable 'n' is a tradeoff between latency and traffic overhead. Increasing n can increase the reachability of the destination node and can decrease the latency, but there can be an increase the traffic overhead. For instance, a suitable tradeoff can be n=3 and m=2.

Another optional way to send the notification messages is similar to source routing. When the host A generates the notification message, the entries that are in the same column of the NHT are carried in the notification message. If the receiver (e.g., host $B_1$) of such a notification message fails to forward this message to host B, then host $B_1$ first checks whether there are entries that remain in the message and if there are, then $B_1$ forwards the notification to the address contained in the first entry of the NHT. In this way, the number of messages sent out by a mobile host may be greatly reduced, and the latency should be less than that of an operation that is working without the functional equivalent of the NHT.

F. Exemplary Computer Environment For Implementing One P2P Participant

In the foregoing description, implementations of the invention were described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 1B:
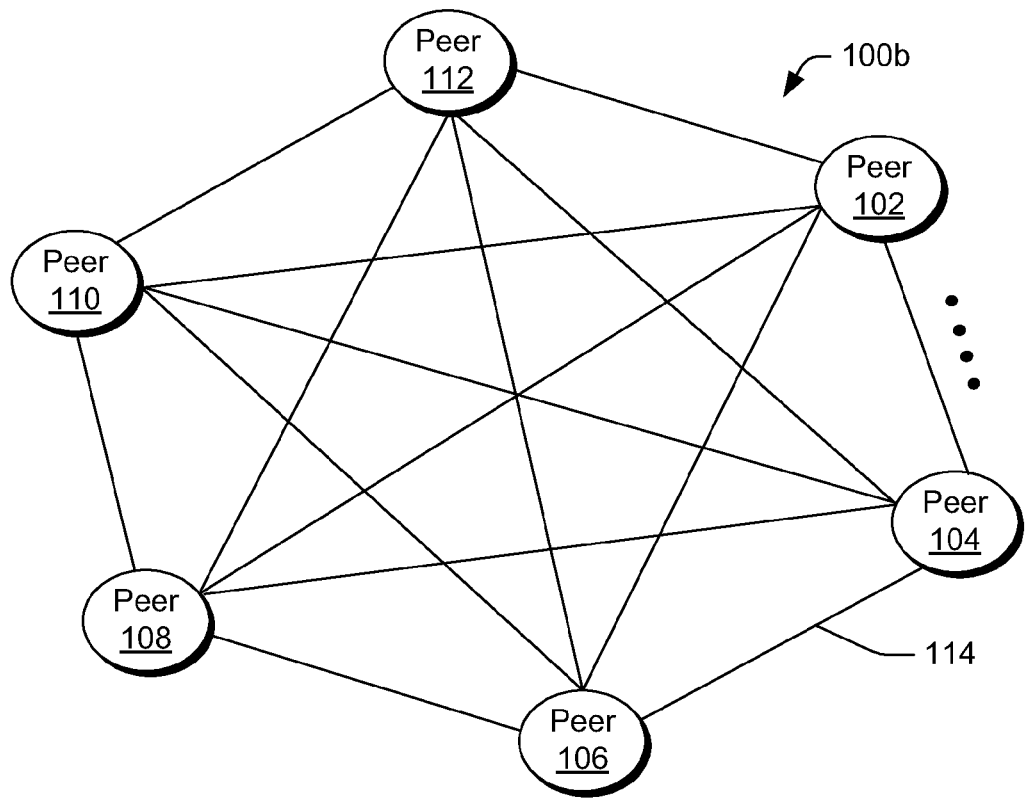

The overlay for the P2P network that was described with respect to FIG. 1a is a data structure that can be spread out over multiple machines and possibly over other infrastructure in a P2P system. Thus, each of the participants in the P2P system can be viewed as implementing a part of the overlay. To achieve this effect, each participant can store the necessary code and data to create the overlay and to interact with it. This code and data can be stored in the volatile and/or non-volatile memory of each participant (to be described below).

For example, FIG. 12 shows a high level view of one exemplary P2P participant as a computer 1242. This computer 1242 corresponds to a general purpose computer or server type computer and an associated display device 1274. However, the computer 1242 can be implemented using other kinds of computing equipment. For example, although not shown, the computer 1242 can include hand-held or laptop devices, set top boxes, mainframe computers, etc.

The exemplary computer 1242 can be used to implement the processes described herein. Computer 1242 includes one or more processors or processing units 1244, a system memory 1246, and a bus 1248 that couples various system components including the system memory 1246 to processors 1244. One or more stores in the computer 1242 can be used to store the code and data used to implement part of an overlay, such as part of the P2P overlay described above.

The bus 1248 represents one or more of any of several types of bus structures, including a memory bus or memory controller, a peripheral bus, an accelerated graphics port, and a processor or local bus using any of a variety of bus architectures. The system memory 1246 includes read only memory (ROM) 1250 and random access memory (RAM) 1252. A basic input/output system (BIOS) 1254, containing the basic routines that help to transfer information between elements within computer 1242, such as during start-up, is stored in ROM 1250.

Computer 1242 further includes a hard disk drive 1256 for reading from and writing to a hard disk (not shown), a magnetic disk drive 1258 for reading from and writing to a removable magnetic disk 1260, and an optical disk drive 1262 for reading from or writing to a removable optical disk 1264 such as a CD ROM or other optical media. The hard disk drive 1256, magnetic disk drive 1258, and optical disk drive 1262 are connected to the bus 1248 by an SCSI interface 1266 or some other appropriate interface. The drives and their associated computer-readable media provide nonvolatile storage of computer-readable instructions, data structures, program modules and other data for computer 1242. Although the exemplary environment described herein employs a hard disk, a removable magnetic disk 1260 and a removable optical disk 1264, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1256, magnetic disk 1260, optical disk 1264, ROM 1250, or RAM 1252, including an operating system 1270, one or more application programs 1272, cache/other modules 1274, and program data 1276.

The application programs 1272 can include modules for end-to-end mobility network management using P2P networking protocols, modules for name to IP address resolution using a protocol for peer name resolution, and modules to perform notifications of address changes and device registration using P2P protocols. Alternatively, these modules can be included in the operating system 1270 or distributed also among the application programs 1272.

A user may enter commands and information into computer 1242 through input devices such as a keyboard 1278 and a pointing device 1280. Other input devices (not shown) may include a microphone, joystick, game pad, satellite dish, scanner, or the like. These and other input devices are connected to the processing unit 1244 through an interface 1282 that is coupled to the bus 1248. A monitor 1284 or other type of display device is also connected to the bus 1248 via an interface, such as a video adapter 1286. In addition to the monitor, personal computers typically include other peripheral output devices (not shown) such as speakers and printers.

Computer 1242 commonly operates in a networked environment using logical connections to one or more remote computers, such as a remote computer 1288. The remote computer 1288 may be a personal computer, another server, a router, a network PC, a peer device or other common network node, and typically includes many or all of the elements described above relative to computer 1242. The logical connections depicted in FIG. 12 include a local area network (LAN) 1290 and a wide area network (WAN) 1292. Such networking environments are commonplace in offices, enterprise-wide computer networks, intranets, and the Internet.

When used in a LAN networking environment, computer 1242 is connected to the local network through a network interface or adapter 1294. When used in a WAN networking environment, computer 1242 typically includes a modem 1296 or other means for establishing communications over the wide area network 1292, such as the Internet. The modem 1296, which may be internal or external, is connected to the bus 1248 via a serial port interface 1268. In a networked environment, program modules depicted relative to the personal computer 1242, or portions thereof, may be stored in the remote memory storage device. It will be appreciated that the network connections shown are exemplary and other means of establishing a communications link between the computers may be used.

Generally, the data processors of computer 1242 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Any of the functions described herein can be implemented using software, firmware (e.g., fixed logic circuitry), manual processing, or a combination of these implementations. The term "logic" or "module" as used herein generally represents software, firmware, or a combination of software and firmware. For instance, in the case of a software implementation, the term "logic" or "module" represents program code that performs specified tasks when executed on a processing device or devices (e.g., CPU or CPUs). The program code can be stored in one or more computer readable memory devices. The illustrated separation of logic and modules into distinct units may reflect an actual physical grouping and allocation of such software and/or hardware, or can correspond to a conceptual allocation of different tasks performed by a single software program and/or hardware unit. The illustrated logic and modules can be located at a single site (e.g., as implemented by a single processing device), or can be distributed over plural locations.

G. Conclusion

When a mobile device moves among different wireless networks, it becomes difficult to locate a mobile user and to maintain the existing connections due to the IP address change of the mobile device. Implementations disclosed herein provide for end-to-end mobility network management using peer to peer (P2P) networking protocols. Name to IP address resolution is done using a PNRP (Peer Name Resolution Protocol) and a unique, static PNRP identification based on the end host's public key as the seed to generate the PNRP identification. Notifications of address changes and device registration can also be handled using the P2P networking protocols.

Certain operations were described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

Further, a number of examples will be presented in this disclosure in the alternative (e.g., case A or case B). In addition, this disclosure encompasses those cases which combine alternatives in a single implementation (e.g., case A and case B), even though this disclosure may not expressly mention these conjunctive cases in every instance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An end host comprising:
a memory including:
executable instructions;
storage for respective identifiers for respective peers of the end host in a peer-to-peer system, wherein the storage comprises:
a multilevel routing table cache (MRTC),
each level in the MRTC includes a maximum number of entries,
each level in the MRTC represents a segment of a number space corresponding to an identifier of the end host,
the top level of the MRTC spans the entire number space,
each successively lower level comprises successively smaller spans,
each said span in a level below the top level is a smaller segment than the entire number space,
each said span is clustered around one said identifier of a corresponding said peer, and
the relative proximity between the peers corresponds to the respective identifiers,
an array for each said peer of the end host, wherein:
each said array includes a neighbor hint table (NHT);
each said array includes one or more entries; and
each said entry corresponds to one neighbor peer of one peer of the end host (NPOP); and
includes an identifier for the NPOP, wherein each said identifier for the NPOP comprises:
an IP address of the respective said NPOP;
a port number of the respective said NPOP; and
an ID generated from a public key of the respective said NPOP, wherein relative proximity between the NPOPs is a function of the proximity of the respective identifiers of the peers;
a processor for executing the executable instructions which, when executed, cause the processor to interact with the end host as a peer in a peer-to-peer fashion in the peer-to-peer system, the interacting comprising:
when a message is sent from the end host to a destination, said peer having an identifier not found in the MRTC, forming a message for a destination peer for which the identifier thereof is not found in the MRTC, wherein the message includes the identifier of the destination peer; and
addressing the message to an intermediate said peer for which the identifier thereof is in the memory and where the intermediate said peer has an address which is proximally closest to the identifier of the destination said peer;
wherein the executable instructions further comprise an architecture that includes:
logic for a kernel layer wherein the logic for the kernel layer comprises:
an internet protocol (IP) layer comprising an end-to-end mobility module for end communications between the end host and another end host in the peer to peer system; and
a transport layer on the IP layer for communications across interconnected networks of the peer-to-peer system; and
logic for an application layer on the kernel layer and wherein the logic for the application layer comprises:
a name resolution module for resolving said identifier for a respective said peer in the peer-to-peer system to IP address, and storing the identifier of the respective said peers of the end host in the storage; and
a notification module of the name resolution module for storing the identifier for each said NPOP in each said entry in each said array.

2. The end host as defined in claim 1,
wherein the proximally closest identifier of the intermediate said peer is found in a portion of the memory selected from the group consisting of: one said entry in one said array; and the MRTC.

3. The end host as defined in claim 1,
Wherein a message be is delivered to a destination said peer from the end host by transmission via a number of said peers, wherein the number of said peers being no more than $O(/Ogk\ N)$ on average over time;

k is a factor by which t-he spans of each said successively lower level is successively smaller; and N is a number of said identifiers in an identifier naming space for the MRTC.

4. The end host as defined in claim 1, wherein the interaction of the end host as a peer in peer-to-peer fashion in the peer-to-peer system comprises forming a message for delivery to a destination said peer via one or more neighbor peers of said destination said peer.

5. The end host as defined in claim 1, wherein the interaction of the end host as a peer in peer-to-peer fashion in the peer-to- peer system comprises addressing a message for transmission to each said NPOP of the peer to which the end host is unable to communicate for further transmission to the peer to which the end host is unable to communicate.

6. The end host as defined in claim 5, wherein the message includes a new IP address of the end host when the IP address of the end host has-changed changes.

7. The end host as defined in claim 1, wherein the interaction of the end host as a peer in peer-to-peer fashion in the peer-to-peer system comprises registering one said identifier for the end host with each of the respective peers of the end host in the peer-to-peer system.

8. The end host as defined in claim 1, wherein the interaction of the end host as a peer in peer-to-peer fashion in the peer-to-peer system comprises: establishing a communication connection between the end host and one said peer of the end host;

losing the established communication connection for a predetermined time threshold;

receiving a message from the one said peer of the end host wherein the message includes a new IP address of the one said peer; and resuming, using the new IP address, the communication connection between the end host and one said peer of the end host.

9. The end host as defined in claim 8, wherein the message is received via one said NPOP.

10. The end host as defined in claim 1, wherein relative proximity between the peers in the peer-to-peer system is a function of the proximity of the respective identifiers of the peers.

11. The end host as defined in claim 1, wherein: each said identifier of each said peer is a numerical expression; and relative proximity between the peers in the peer-to-peer system corresponds to numerical proximity of the respective identifiers of the peers.

12. The end host as defined in claim 1, wherein each said identifier of each said peer comprises: an IP address of the peer; and an ID generated from a public key of the peer, wherein relative proximity between the peer and other said peers in the peer-to-peer system is a function of the proximity of the respective identifiers of the peers.

13. The end host as defined in claim 1, wherein the entries in each said array are ordered according to a priority of the NPOP selected from the group consisting of:

available bandwidth of the NPOP; proximity of the NPOP to the corresponding said peer of the end host;

degree of trust between the NPOP and the corresponding said peer of the end host;

probability that the IP address of the NPOP will change; and a combination of the foregoing.

14. The end host as defined in claim 1, wherein the transport layer on the IP layer is a TCP UDP layer.

15. The end host as defined in claim 1, wherein each said peer in the peer-to-peer system is selected from the group consisting of:

a cellular telephone;

a computing device having a wired connection to the peer to peer system;

and a computing device having a wireless connection to the peer to peer system.

16. The end host as defined in claim 1, wherein the interaction of the end host as a peer in peer-to-peer fashion in the peer-to-peer system comprises:

receiving updates to the identifier for the NPOP for each entry in each array; and sending an updated IP address for the end host to each peer of the end host.

17. A peer to peer system comprising first and second means for interacting as respective peers in a peer-to-peer fashion in a peer-to-peer system, wherein each said first and second means respectively comprises:

a processing means for interacting in the peer-to-peer system;

one or more close peers in the peer-to-peer system, wherein each said close peer includes one or more neighbor peers (NP);

means for storing one identifier in memory for each of the one or more close peers, wherein the means for storing one identifier for each of the one or more close peers comprises a multilevel routing table cache (MRTC), wherein each level in the MRTC includes a maximum number of entries, wherein each level in the MRTC represents a segment of a number space corresponding to an identifier of the respective first and second means, wherein the top level of the MRTC spans the entire number space, wherein each successively lower level includes successively smaller spans, wherein each said span in a level below the top level is a smaller segment than the entire number space, wherein each said span is clustered around one said identifier of a corresponding said close peer, and wherein the relative proximity between the close peers corresponds to the respective identifiers;

means for storing an array for each said close peer, wherein:

each said array includes a neighbor hint table (NHT); each said array includes one or more entries; and each said entry:

corresponds to one said NP; and includes an identifier for the NP;

includes an identifier for the NP, wherein each said identifier for the NPOP comprises:

an IP address of the respective said NP;

a port number of the respective said NP; and an ID generated from a public key of the respective said NP, wherein relative proximity between the NPs is a function of the proximity of the respective identifiers of the peers;

wherein the first means is a close peer to the second means when the IP address of the first means changes and there is a break in an ongoing communication between the first and second means for longer than a predetermined time threshold, each of the first and second means further comprises:
   means for addressing a message for transmission to each NP of each close peer of the other of the first and second means for delivery of the message thereto via each NP, wherein the message includes the changed IP address thereof; and
   means for:
     receiving the message via the NP;
     extracting the changed IP address of the other of the first and second means from the message; and
     resuming the ongoing communication using the changed IP address of the other of the first and second means.
wherein the communication between the first and second means further comprise an architecture that includes:
   logic for a kernel layer wherein the logic for the kernel layer comprises:
     an internet protocol (IP) layer comprising an end-to-end mobility module for end communications between the end host and another end host in the peer to peer system; and
     a transport layer on the IP layer for communications across interconnected networks of the peer-to-peer system; and
   logic for an application layer on the kernel layer and wherein the logic for the application layer comprises:
     a name resolution module for resolving said identifier for a respective said peer in the peer-to-peer system to IP address, and storing the identifier of the respective said peers of the end host in the storage; and
     a notification module of the name resolution module for storing the identifier for each said NPOP in each said entry in each said array.

18. The peer-to-peer system as defined in claim 17, wherein, when the IP address of either of the first and second means changes, said either of the first and second means respectively further comprises:
means for addressing a message for transmission to each said NP when communication can not be made, after a predetermined threshold, to the corresponding said close peer,
wherein the message includes the changed IP address; and
means for:
   receiving the message;
   extracting the changed IP address from the message; and
   communicating with the corresponding said close peer using the changed IP address.

19. The peer-to-peer system as defined in claim 17, wherein each of the first and second means further comprises:
means for registering an identifier thereof with each of the close peers;
and means for receiving an identifier for each of the NP of each of the close peers.

20. The peer-to-peer system as defined in claim 17, wherein for the first means, when a message is sent to a peer in the peer to peer system having an identifier not found in the MRTC of the first means, the first means further comprises:
means for forming a message for a destination said peer for which the identifier thereof is not found in the memory, wherein the message includes the identifier of the destination said peer; and
means for addressing the message to an intermediate said peer for which the identifier thereof is in the memory of the intermediate said peer, and is the proximally closest to the identifier of the destination said peer.

21. The peer-to-peer system as defined in claim 17, wherein the proximally closest said identifier of the intermediate said peer is found in a portion of the memory selected from the group consist of: one said entry in one said array; and the MRTC.

22. The peer-to-peer system as defined in claim 17, wherein: the message is delivered to the destination said peer from the first means by transmission via a number of said peers, wherein the number of said peers being no more than $o(\log_k N)$ in average;
k is a factor by which the spans of each said successively lower level is successively smaller; and
N is a number of identifiers in an identifier naming space for the MRTC.

23. The peer-to-peer system as defined in claim 17, wherein each said peer is selected from the group consisting of: a cellular telephone; a computing device having a wired connection to the peer to peer system;
   and a computing device having a wireless connection to the peer to peer system.

\* \* \* \* \*